(No Model.)

A. W. PAULL.
MANUFACTURE OF COMBINED GLASS AND METALLIC ARTICLES.

No. 267,924. Patented Nov. 21, 1882.

Witnesses
R. C. Trimshall
W. B. Corwin

Inventor
Archibald W. Paull,
by his attys
Bakewell & Kerr

N. PETERS, Photo-Lithographer, Washington, D. C.

UNITED STATES PATENT OFFICE.

ARCHIBALD W. PAULL, OF WHEELING, WEST VIRGINIA, ASSIGNOR OF ONE-HALF TO JOHN F. MILLER, OF MARTIN'S FERRY, OHIO.

MANUFACTURE OF COMBINED GLASS AND METALLIC ARTICLES.

SPECIFICATION forming part of Letters Patent No. 267,924, dated November 21, 1882.

Application filed June 5, 1882. (No model.)

*To all whom it may concern:*

Be it known that I, ARCHIBALD W. PAULL, of Wheeling, in the county of Ohio and State of West Virginia, have invented a new and useful Improvement in Manufacture of Combined Glass and Metallic Articles; and I do hereby declare the following to be a full, clear, and exact description thereof.

My invention consists of an improved method of uniting metallic and glass surfaces. Heretofore this has been done by casting the glass article upon metallic attachments having projections and recesses of various forms upon the metallic article, so that the glass, taking in or around said projections or recesses, shall become hardened, and so retain the metallic attachments in permanent connection therewith. The objection, however, to all such articles is that the glass, becoming cooled by contact with the metal, is liable to be easily fractured, and even where the article has come successfully through the operation of making the article is liable to "fly" at any time, there being an inherent defect in its construction, due to the unequal expansion and contraction of the glass and the metal, and to the imperfect union formed between them at the time of making. Another reason for this breakage is the fact that the glass shrinks in cooling, and unless the embedded part is long is liable to shrink off from the projection or out of the recess in the metallic attachments. These prior methods of securing metallic attachments to glassware have been practiced mainly in the manufacture of peg-lamps.

My invention consists in casting the glass article against a heated metallic surface, whereby the meeting faces of metal and glass form a permanent weld, and the body of the glass is not broken up by the extension of the metal into it.

To enable others skilled in the art to make and use my invention, I will now describe it by reference to the accompanying drawings, in which—

Figure 1:
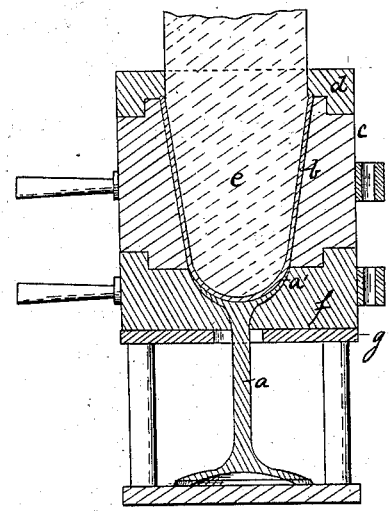
Figure 2:
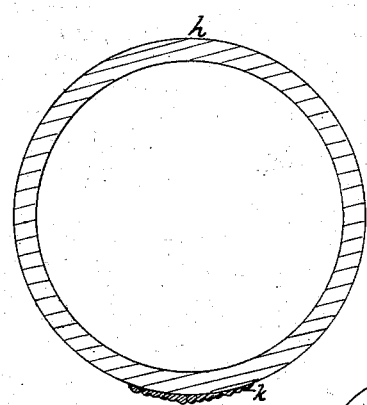
Figure 3:
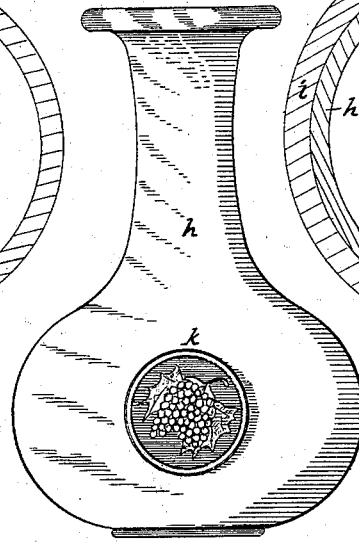
Figure 4:
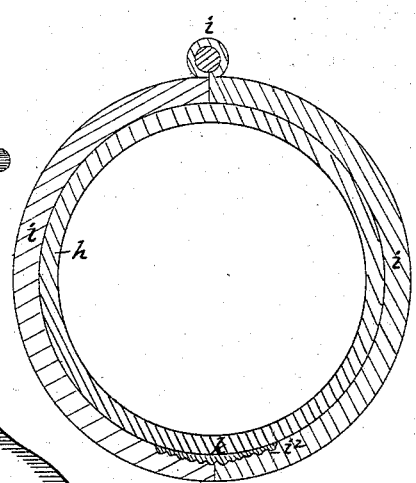

Figure 1 illustrates the manufacture of a goblet with a glass body and metallic stem and foot. Figs. 2, 3, and 4 show the manufacture of a carafe or water-bottle with a metallic ornament or medallion on its side.

Like letters of reference indicate like parts in each.

In Fig. 1, $a$ is a metallic stem and foot of a goblet; $b$, a glass bowl or body. $c$ is a two-part mold for forming the glass body $b$. $d$ is a ring. $e$ is a plunger. $f$ is the lower mold-section for containing the cup $a'$ of the metallic stem $a$, which forms the lower end of the mold-cavity in which the glass bowl $b$ is made. $g$ is a stand in which the metallic stem $a$ is placed preparatory to the pressing of the bowl $b$ thereon. The stem $a$ is heated and placed on the stand $g$. Then the mold-section $f$ is closed around it, and the mold $c$ and ring $d$ placed thereon. The glass is then put into the mold-cavity and pressed into shape by the plunger $e$. This causes it to be forced down upon the inner surface of the heated cup $a'$ of the metallic stem $a$ and to weld thereto. The goblet is then removed from the mold and finished and annealed in the usual way.

In Fig. 4 I show a cross-section of the mold in which the water-bottle $h$ (shown in Figs. 2 and 3) is blown. This mold is composed of two parts, $i$ $i$, having a hinge, $i'$, and a recess, $i^2$, common to the meeting edges of the two sections. A medallion formed of thin metal, and having a thickness equal to the depth of the recess $i^2$, is first heated and placed in the recess and the mold $i$ closed upon it. The edges of the recess overlap the edges of the medallion $k$ slightly, so that when the mold is closed it shall be retained in position in the recess. The bottle is then blown in the mold, and the glass, coming in contact with the heated medallion $k$, unites therewith and makes a weld. The bottle is then finished in the usual way.

This invention may be used in the application of metallic attachments to a great many different kinds of articles. In this connection I will state that by making the mold $i$ in a greater number of parts the medallions $k$ may be applied at a number of points around the circumference of the water-bottle. This is also true in relation to the attachment of similar parts upon other articles of glassware. If the metal of which the medallion is made is very light, the temperature of the mold, if being used, and of the glass which is cast in the mold, will be sufficient to bring the medallion up to the proper heat to unite with the glass without the necessity of a heating external to the mold. In heating these metallic attachments it is of course necessary to be careful not to heat them to so high a temperature as would cause them to fuse.

What I claim as my invention, and desire to secure by Letters Patent, is—

1. The method of making glass articles with metallic attachments consisting in blowing or casting the glass article upon or against the hard heated plain surface of the metallic attachment, so as to form a weld therewith, substantially as described.

2. The method of making glass articles with metallic attachments consisting in blowing or casting the glass article upon a heated metallic attachment placed in a cavity or cavities of the mold, the temperature of said metallic attachment being below the point of fusion, substantially as described.

In testimony whereof I have hereunto set my hand this 26th day of May, A. D. 1882.

ARCHIBALD W. PAULL.

Witnesses:
T. B. KERR,
L. C. FITLER.